Jan. 13, 1925.

W. H. MINER 1,522,532

CAR CONSTRUCTION

Filed Jan. 8, 1923

2 Sheets-Sheet 1

Witnesses
Wm. Geiger

Inventor
William H. Miner
By George J. Haight
his Atty.

Jan. 13, 1925.

W. H. MINER 1,522,532

CAR CONSTRUCTION

Filed Jan. 8, 1923  2 Sheets-Sheet 2

Witnesses
Wm. Geiger

Inventor
William H. Miner
By George I. Haight
his Atty.

Patented Jan. 13, 1925.

1,522,532

UNITED STATES PATENT OFFICE.

WILLIAM H. MINER, OF CHAZY, NEW YORK, ASSIGNOR, BY MESNE ASSIGNMENTS, TO W. H. MINER, INC., A CORPORATION OF DELAWARE.

CAR CONSTRUCTION.

Application filed January 8, 1923. Serial No. 611,247.

*To all whom it may concern:*

Be it known that I, WILLIAM H. MINER, a citizen of the United States, residing at Chazy, in the county of Clinton and State of New York, have invented a certain new and useful Improvement in Car Constructions, of which the following is a full, clear, concise, and exact description, reference being had to the accompanying drawings, forming a part of this specification.

This invention relates to improvements in car construction.

In the operation of railroads, experience has shown the advisability of so connecting the body and truck bolsters of the car that they cannot separate vertically in the event of collision or derailment, since this effectually prevents or minimizes turning over or telescoping of the cars. In those cars employing four wheel trucks, no difficulty is experienced in applying the bolster locking means. In the case of six wheel trucks, however, where the center axle extends immediately beneath and closely adjacent the center pin opening, it is impossible to apply the locking center pin from below. Further difficulty is encountered in the case of dining cars, buffet cars and baggage cars on account of the permanent fixtures on the interior of the car which render it impossible to apply the locking center pin from the top of the bolsters. It is also extremely difficult to obtain access to the space between the center sills over the center plates on account of the trucks and other appliances found beneath the car floor.

One object of my invention is to provide, in car construction, a body and truck bolster locking arrangement of efficient type, and more particularly for those car constructions where access from above or below the center pin opening is practically impossible.

More specifically, the object of my invention is to provide, in car construction, body and truck bolster locking means wherein the center plate of the body bolster is detachable from the car underframe, the means employed for locking said center plate to the underframe being so arranged that they are readily accessible for insertion and removal through openings provided in the body bolster diaphragms.

Other objects of the invention will more clearly appear from the description and claims hereinafter following.

Figure 1:
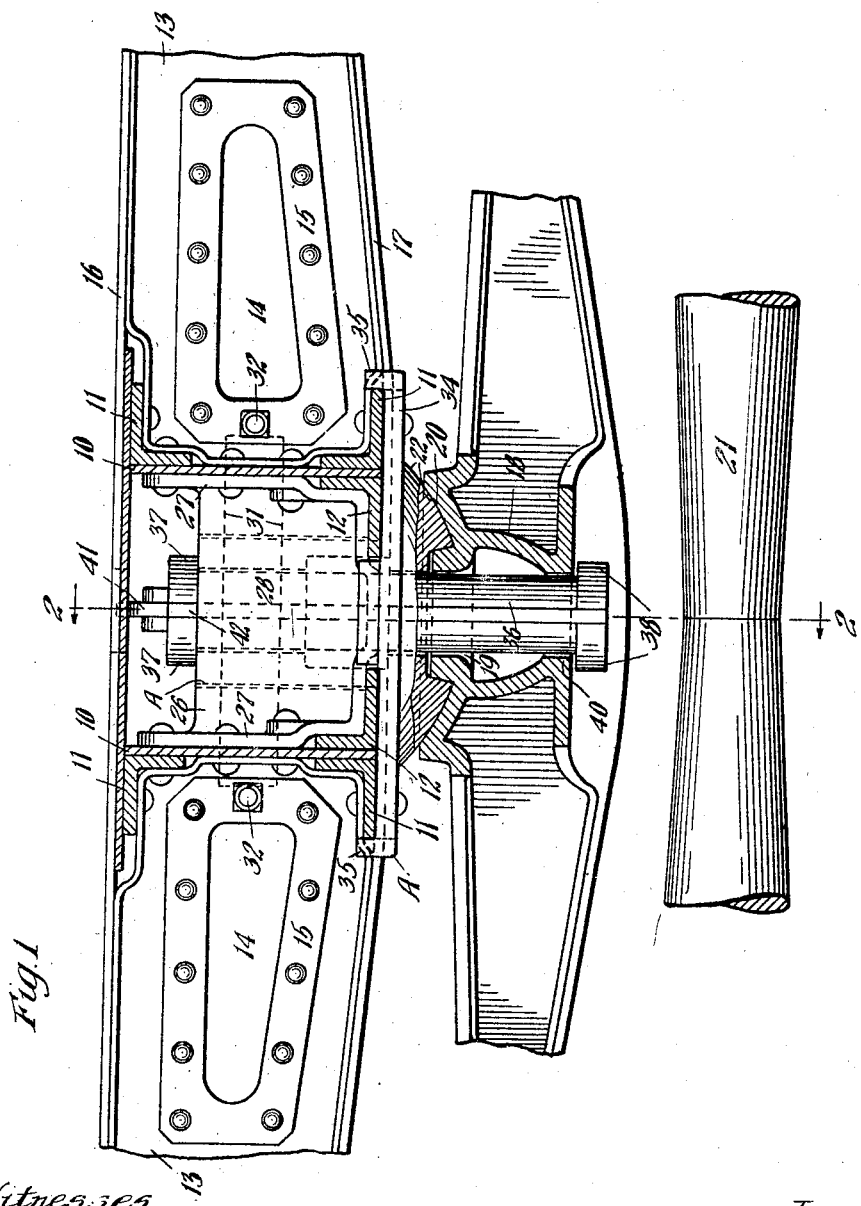
Figure 2:
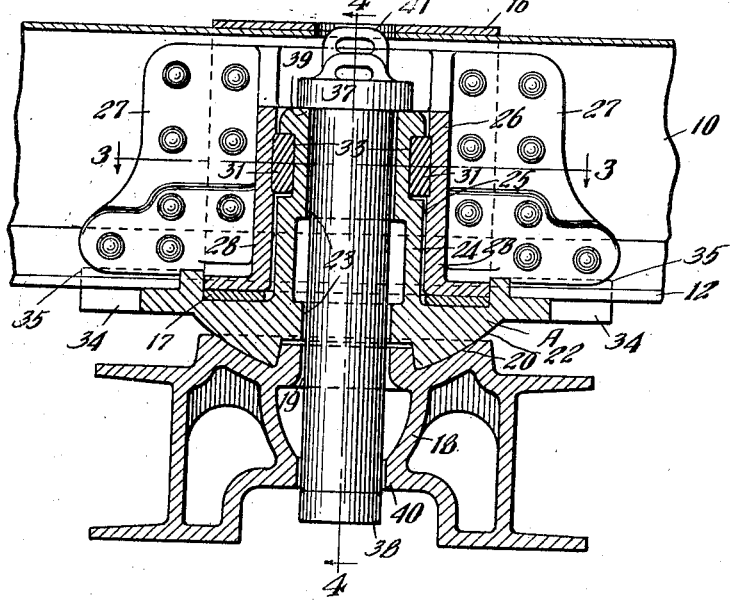
Figure 3:
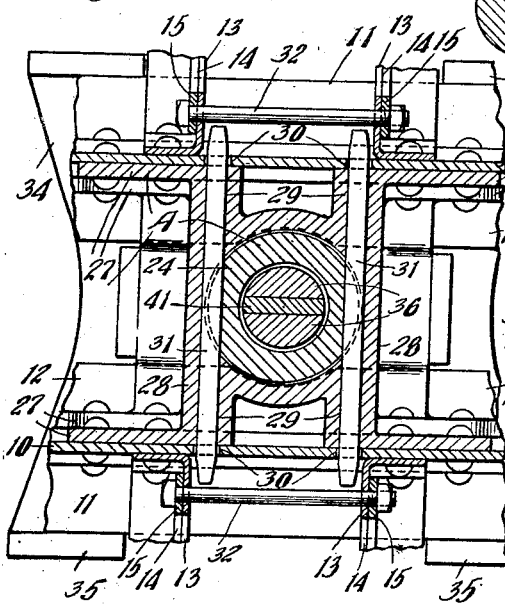
Figure 4:
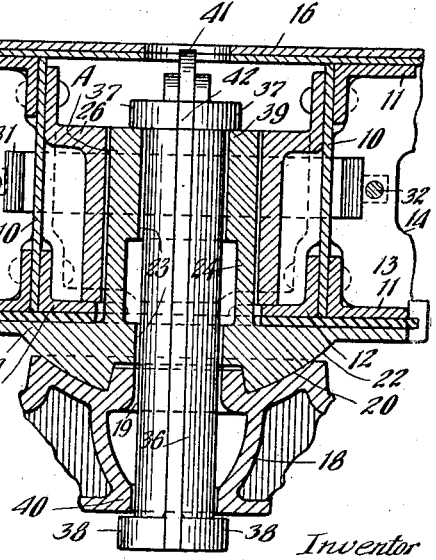

In the drawings forming a part of this specification, Figure 1 is a vertical transverse sectional view of a portion of a car construction taken partially through the center bearing plates and showing my improvements in connection therewith. Fig. 2 is a vertical transverse sectional view corresponding to the section line 2—2 of Fig. 1. Fig. 3 is a horizontal sectional view corresponding to the section line 3—3 of Fig. 2. And Fig. 4 is a vertical sectional view corresponding to the section line 4—4 of Fig. 2.

In said drawings, center sills are shown, each of the same comprising a vertical plate 10 and upper and lower angles 11—11 secured to the outer side thereof. Preferably, another angle 12 is secured to each plate along the lower edge thereof on the inner side, as clearly illustrated in Figures 1 and 4. In the car construction shown, the body bolster is formed by means of pressed, spaced plate diaphragms 13—13 on each side of the center, each of said diaphragms 13 having a relatively large opening 14 therein, the edges of the opening being surrounded by re-enforcing plate 15. Said openings 14 are made of sufficient size to readily permit a man's arm and part of his body entering therein to obtain access to certain parts, as hereinafter described. The diaphragms will preferably be united by a top tension plate 16 and a lower compressing plate 17.

The truck bolster, as shown in Fig. 1, is of the four armed spider type, with the arms and the center bearing section 18 all cast integrally, as customary in trucks of the six wheel type. The truck bolster is provided with the usual king or center pin opening 19 and a center bearing top face 20. The central axle of the six wheel truck is indicated at 21.

In carrying out my invention, I employ a body bolster center bearing casting designated generally by the reference A. The latter is provided at its lower end with a spherical bearing face 22 co-operable with the truck center bearing face 20. The casting A is also provided with an aligned center bearing or king pin opening 23 and an upward extension 24 which fits within a correspondingly shaped recess 25 provided in a bolster filler casting 26. The latter has vertical side flanges 27—27 riveted to the inner faces of the center sills and transversely extending webs 28—28, the latter having a pair of transversely extending rectangular openings 29—29 therein. The center sills are apertured as indicated at 30—30 opposite the openings 29 to thereby permit the insertion and removal of a pair of heavy keys 31—31. The latter are made of such length that, when in operative position, the opposite ends thereof will project a short distance outward beyond the corresponding center sills, as best shown in Fig. 3. To prevent the keys 31 becoming displaced, a pair of bolts 32 are employed, one on each side of the center sill construction and extending parallel with the center sill and mounted in the respective sets of diaphragms 13. The bolts 32 are placed in line with the ends of the keys 31 so that it is necessary to remove one of the bolts before the keys 31 can be removed.

As clearly shown in Fig. 2, the upward extension 24 of the body center bearing member A is notched as indicated at 33—33 to correspond with the cross section of and to accommodate the keys 31. With this construction, it is evident that the center bearing block A is detachably secured to the underframe of the car and yet can be readily removed by taking out the keys 31. In this connection, it will be observed that either bolt 32 may be readily removed since they are located outside of the center sills, and it is a comparatively easy matter for a man to insert his arm through any one of the diaphragm openings 14 and remove the keys 31.

Preferably, the center bearing block A is provided with laterally and longitudinally extended flanges 34, the latter having up-turned edges 35 adapted to engage the lower angles 11 and front and rear edges of the filler casting 26 at the bottom of the latter, as shown in Figures 1 and 2.

To detachably pivotally lock the body and truck center bearing sections, I employ a sectional three piece center pin. The latter comprises two side members 36—36 each of approximately semi-circular cross section, said members 36 having laterally extended flanges at the top and bottom ends thereof as indicated at 37—38, said flanges taking over co-operating shoulders 39 and 40 formed respectively at the upper end of the center bearing block A and the lower end of the center bearing section 18 of the truck bolster. Said members 36 with their flanges 37 and 38 (see Fig. 4) are so proportioned that, when the two are placed in face to face contact, they may be inserted through the center pin openings and, after being spread apart, are held in separated operative condition by a spreader plate 41 preferably shouldered at its upper end as indicated at 42, best shown in Fig. 4, so as to rest upon the top end of the bearing block A.

In the use of my invention, the center bearing block A and locking center pin will first be properly assembled with the truck bolster. The car body is then jacked up and the truck with the center bearing members assembled as indicated, run beneath the car body and the latter allowed to drop over the upward extension 24 of the center bearing block A. The keys 31 are then applied and finally the retaining bolts 32. The reverse procedure is adopted when it is desired to disconnect the body and truck bolsters.

With the construction described, it is evident that I am enabled to readily apply or remove a locking center pin on cars of those types wherein it is impossible to obtain access from either above or below the center pin opening.

I have herein shown and described what I now consider the preferred manner of carrying out the invention, but the same is merely illustrative and all changes and modifications are contemplated that come within the scope of the claims appended hereto.

I claim:

1. In car construction, the combination with a body bolster and a truck bolster, the latter having a center bearing section associated therewith; of an independent body center bearing block detachable with respect to the body bolster, said block and body bolster having opposed shoulders thereon; and means, insertable and removable through said shoulders transversely of the car, for locking said center bearing block to the body bolster.

2. In car construction, the combination with a body bolster and a truck bolster, the latter having a center bearing section rigidly associated therewith; of an independent body center bearing block detachable with respect to the body bolster; and means, insertable and removable transversely of the car, for locking said center bearing block to the body bolster, said means including horizontally disposed keys each extending through both the center sills.

3. In car construction, the combination with a body bolster and a truck bolster, the latter having a center bearing section rigidly associated therewith; of an independent body center bearing block detachable with respect to the body bolster; and keys of a length to extend across said block, insertable and removable transversely of the car, for locking said block to the body bolster.

4. In car construction, the combination with a body bolster and a truck bolster, the latter having a center bearing section rigidly associated therewith; of an independent body center bearing block detachable with respect to the body bolster; keys, insertable and removable transversely of the car, for locking said block to the body bolster; and independently carried retaining means at the ends of said keys.

5. In car construction, the combination with the center sills and a body bolster, the latter comprising spaced pairs of diaphragms at each side of the center sill and a center filler block, one of said diaphragms having an opening therein adjacent the corresponding center sill; of a truck bolster having a center bearing section permanently associated therewith; a body bolster center bearing block detachable with respect to said filler block; and means for locking said center bearing block to the filler block, said means being accessible through said opening of the diaphragm.

6. In car construction, the combination with the center sills and a body bolster, the latter comprising spaced diaphragms at each side of the center sill and a center filler block, the latter having a vertical opening therein and transversely extending openings, the center sills being apertured opposite said transverse openings; of a body bolster center bearing block having an upward extension insertable within said vertical opening of the filler block; and transversely extending keys within said transverse openings of the filler block and center sill openings, said keys engaging shoulders provided on the center bearing block for detachably locking the latter to the filler block.

7. In car construction, the combination with the center sills and a body bolster, the the latter comprising spaced diaphragms at each side of the center sill and a center bolster filler block, said diaphragms having openings therein and the filler block having a vertically extending opening and transversely extending openings; of a truck bolster having a center bearing section permanently associated therewith; a body bolster center bearing block co-operable with the center bearing section of the truck bolster, said bearing block having an upward extension fitting within said vertical opening of the filler block; a detachable sectional shouldered center pin extending through the center bearing section of the truck bolster and said bearing block and arranged to prevent accidental vertical separation thereof; keys extending horizontally through the center sills and through said horizontal openings of the filler block, said keys being disposed within the planes of the diaphragms and accessible through said openings of the diaphragms, said keys detachably locking said bearing block to the filler block.

In witness that I claim the foregoing I have hereunto subscribed my name this 3rd day of January 1923.

WILLIAM H. MINER.

Witnesses:
META SCHMIDT,
HARRIETTE M. DEAMER.